United States Patent
Pool et al.

(10) Patent No.: US 8,397,836 B2
(45) Date of Patent: *Mar. 19, 2013

(54) PRESSURE AND FLOW CONTROL IN DRILLING OPERATIONS

(75) Inventors: Charles M. Pool, Bedford, TX (US); Nancy Davis, Irving, TX (US); Frank Urias, Plano, TX (US); Neal G. Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,688

(22) Filed: Jun. 8, 2012

(65) Prior Publication Data

US 2012/0277918 A1 Nov. 1, 2012

Related U.S. Application Data

(63) Continuation of application No. 13/022,964, filed on Feb. 8, 2011, now Pat. No. 8,286,730, which is a continuation-in-part of application No. 12/638,012, filed on Dec. 15, 2009, now Pat. No. 8,281,875.

(51) Int. Cl.
*E21B 10/22* (2006.01)
(52) U.S. Cl. .................. 175/50; 703/7; 714/E11.025
(58) Field of Classification Search .............. 175/50; 703/7; 714/E11.025
See application file for complete search history.

(56) References Cited

U.S. PATENT DOCUMENTS

| | | | |
|---|---|---|---|
| 4,194,567 A | 3/1980 | Marais | |
| 4,474,254 A | 10/1984 | Etter et al. | |
| 4,635,735 A | 1/1987 | Crownover | |
| 4,899,832 A | 2/1990 | Bierscheid, Jr. | |
| 5,109,934 A | 5/1992 | Mochizuki | |
| 5,720,356 A | 2/1998 | Gardes | |
| 5,771,974 A | 6/1998 | Stewart et al. | |
| 6,065,550 A | 5/2000 | Gardes | |
| 6,173,768 B1 | 1/2001 | Watson | |
| 6,230,824 B1 | 5/2001 | Peterman et al. | |
| 6,263,982 B1 | 7/2001 | Hannegan et al. | |
| 6,457,540 B2 | 10/2002 | Gardes | |
| 6,892,812 B2 * | 5/2005 | Niedermayr et al. | 166/250.15 |
| 6,904,981 B2 | 6/2005 | Van Riet | |

(Continued)

FOREIGN PATENT DOCUMENTS

| | | |
|---|---|---|
| EP | 1432887 B1 | 3/2003 |
| EP | 1488073 B1 | 8/2003 |

(Continued)

OTHER PUBLICATIONS

Chinese Office Action issued Nov. 13, 2012 for CN Patent Application No. 200780049409.0, 3 pages.

(Continued)

*Primary Examiner* — William P Neuder
(74) *Attorney, Agent, or Firm* — Smith IP Services, P.C.

(57) ABSTRACT

A method of maintaining a desired downhole pressure during a drilling operation can include measuring a parameter with a sensor, communicating actual parameter values from the sensor to a predictive device, training the predictive device to output predicted parameter values in response to input of the actual parameter values, and outputting the predicted parameter values from the predictive device when the predictive device ceases receiving the actual parameter values. A well drilling system can include a predictive device which outputs predicted parameter values in response to input of actual parameter values to the predictive device. The predictive device continues to output the predicted parameter values, even when the predictive device fails to receive valid actual parameter values. Another well drilling system includes a data validator which communicates valid actual parameter values to the predictive device, but does not communicate invalid actual parameter values to the predictive device.

50 Claims, 9 Drawing Sheets

U.S. PATENT DOCUMENTS

| | | | |
|---|---|---|---|
| 6,981,561 B2 | 1/2006 | Krueger et al. |
| 7,044,237 B2 | 5/2006 | Leuchtenberg |
| 7,055,627 B2 | 6/2006 | Fontana et al. |
| 7,096,975 B2 | 8/2006 | Aronstam et al. |
| 7,134,489 B2 | 11/2006 | Van Riet |
| 7,174,975 B2 | 2/2007 | Krueger et al. |
| 7,185,718 B2 | 3/2007 | Gardes |
| 7,185,719 B2 | 3/2007 | Van Riet |
| 7,207,399 B2 | 4/2007 | Duhe et al. |
| 7,264,058 B2 | 9/2007 | Fossli |
| 7,270,185 B2 | 9/2007 | Fontana et al. |
| 7,278,496 B2 | 10/2007 | Leuchtenberg |
| 7,296,640 B2 | 11/2007 | Tettleton |
| 7,350,597 B2 | 4/2008 | Reitsma et al. |
| 7,353,887 B2 | 4/2008 | Krueger et al. |
| 7,367,410 B2 | 5/2008 | Sangesland |
| 7,367,411 B2 | 5/2008 | Leuchtenberg |
| 7,395,878 B2 | 7/2008 | Reitsma et al. |
| 7,497,266 B2 | 3/2009 | Fossli |
| 7,513,310 B2 | 4/2009 | Fossli |
| 7,562,723 B2 | 7/2009 | Reitsma |
| 7,650,950 B2 | 1/2010 | Leuchtenberg |
| 7,658,228 B2 | 2/2010 | Moksvold |
| 7,677,329 B2 | 3/2010 | Stave |
| 7,708,064 B2 | 5/2010 | Sehsah |
| 7,721,822 B2 | 5/2010 | Krueger et al. |
| 7,806,203 B2 | 10/2010 | Krueger et al. |
| 7,913,774 B2 | 3/2011 | Partouche |
| 2002/0092655 A1 | 7/2002 | Fincher et al. |
| 2002/0108783 A1 | 8/2002 | Elkins et al. |
| 2002/0112888 A1 | 8/2002 | Leuchtenberg |
| 2003/0066650 A1 | 4/2003 | Fontana et al. |
| 2003/0066686 A1 | 4/2003 | Conn |
| 2003/0098181 A1 | 5/2003 | Aronstam et al. |
| 2003/0127230 A1 | 7/2003 | Von Eberstein, Jr. et al. |
| 2003/0139916 A1 | 7/2003 | Choe et al. |
| 2003/0220742 A1* | 11/2003 | Niedermayr et al. ............. 702/9 |
| 2004/0040746 A1 | 3/2004 | Niedermayr et al. |
| 2004/0124008 A1 | 7/2004 | Fincher et al. |
| 2004/0206548 A1 | 10/2004 | Aronstam et al. |
| 2005/0092523 A1 | 5/2005 | McCaskill et al. |
| 2006/0006004 A1 | 1/2006 | Terry et al. |
| 2006/0065402 A9 | 3/2006 | Fontana et al. |
| 2006/0086538 A1 | 4/2006 | Van Riet |
| 2006/0169491 A1 | 8/2006 | Fossli |
| 2006/0207795 A1 | 9/2006 | Kinder et al. |
| 2007/0068704 A1 | 3/2007 | Krueger et al. |
| 2007/0168056 A1* | 7/2007 | Shayegi et al. ................ 700/48 |
| 2007/0240875 A1 | 10/2007 | Van Riet |
| 2007/0278007 A1 | 12/2007 | Krueger et al. |
| 2008/0041149 A1 | 2/2008 | Leuchtenberg |
| 2008/0060846 A1 | 3/2008 | Belcher et al. |
| 2009/0211239 A1 | 8/2009 | Askeland |
| 2010/0006297 A1 | 1/2010 | Stave |
| 2011/0024189 A1 | 2/2011 | Saeed et al. |
| 2011/0114389 A1 | 5/2011 | Mathena |
| 2011/0139464 A1 | 6/2011 | Henderson et al. |
| 2011/0139509 A1* | 6/2011 | Pool et al. ...................... 175/50 |
| 2011/0290562 A1 | 12/2011 | Standifird et al. |

FOREIGN PATENT DOCUMENTS

| | | |
|---|---|---|
| EP | 1595057 B1 | 9/2004 |
| EP | 1664478 B1 | 2/2005 |
| EP | 1907664 A1 | 4/2008 |
| EP | 1917444 A1 | 5/2008 |
| EP | 1969204 A2 | 9/2008 |
| EP | 2053196 A1 | 4/2009 |
| EP | 2150681 A1 | 2/2010 |
| EP | 2171207 A1 | 4/2010 |
| EP | 2179127 A1 | 4/2010 |
| EP | 2231997 A2 | 9/2010 |
| GB | 2229787 A | 10/1990 |
| WO | 9942696 A1 | 8/1999 |
| WO | 0183941 A1 | 11/2001 |
| WO | 0190528 A1 | 11/2001 |
| WO | 0244518 A1 | 6/2002 |
| WO | 03025334 A8 | 3/2003 |
| WO | 03025336 A1 | 3/2003 |
| WO | 03071091 A9 | 8/2003 |
| WO | 2004005667 A1 | 1/2004 |
| WO | 2004074627 A1 | 9/2004 |
| WO | 2004085788 A3 | 10/2004 |
| WO | 2005001237 A1 | 1/2005 |
| WO | 2005017308 A1 | 2/2005 |
| WO | 2006029379 A1 | 3/2006 |
| WO | 2006031119 A1 | 3/2006 |
| WO | 2006099362 A1 | 9/2006 |
| WO | 2006118920 A3 | 11/2006 |
| WO | 2006138565 A1 | 12/2006 |
| WO | 2007016000 A1 | 2/2007 |
| WO | 2007030017 A1 | 3/2007 |
| WO | 2007112292 A3 | 4/2007 |
| WO | 2007081711 A3 | 7/2007 |
| WO | 2007124330 A3 | 11/2007 |
| WO | 2007126833 A1 | 11/2007 |
| WO | 2008133523 A1 | 11/2008 |
| WO | 2008134266 A1 | 11/2008 |
| WO | 2008151128 A9 | 12/2008 |
| WO | 2008156376 A1 | 12/2008 |
| WO | 2009017418 A1 | 2/2009 |
| WO | 2009018448 A2 | 2/2009 |
| WO | 2009058706 A2 | 5/2009 |
| WO | 2009086442 A3 | 7/2009 |
| WO | 2009111412 A1 | 9/2009 |
| WO | 2009123476 A1 | 10/2009 |
| WO | 2010065646 A3 | 6/2010 |
| WO | 2010095947 A1 | 8/2010 |
| WO | 2011043764 A1 | 4/2011 |

OTHER PUBLICATIONS

Australian Office Action issued Oct. 5, 2010 for AU Patent Application No. 2007317276, 2 pages.
International Search Report with Written Opinion issued Oct. 13, 2010 for PCT Patent Application No. PCT/US10/020122, 13 pages.
International Search Report with Written Opinion issued Jan. 25, 2011 for PCT Patent Application No. PCT/US10/032578, 9 pages.
International Preliminary Report with Patentability issued Jun. 30, 2011 for PCT Patent Application No. PCT/US08/087686, 6 pages.
Office Action issued Sep. 16, 2011 for U.S. Appl. No. 12/299,411, 23 pages.
International Search Report with Written Opinion issued Nov. 21, 2011 for PCT Patent Application No. PCT/US11/036616, 13 pages.
Office Action issued Nov. 25, 2011 for U.S. Appl. No. 13/084,841, 19 pages.
International Search Report with Written Opinion issued Dec. 13, 2011 for PCT Patent Application No. PCT/US11/035751, 16 pages.
International Search Report with Written Opinion issued Dec. 21, 2011 for PCT Patent Application No. PCT/US11/031790, 15 pages.
Singapore Examination Report issued Dec. 27, 2011 for SG Patent Application No. 200903022-2, 8 pages.
Office Action issued Jan. 24, 2012 for U.S. Appl. No. 12/638,012, 18 pages.
Pre-Interview First Office Action issued Jul. 14, 2010 for U.S. Appl. No. 11/936,411, 14 pages.
International Search Report with Written Opinion issued Jun. 17, 2011 for PCT Patent Application No. PCT/US10/056433, 9 pages.
Office Action issued Feb. 7, 2012 for U.S. Appl. No. 13/022,964, 15 pages.
International Search Report with Written Opinion issued Feb. 8, 2012 for PCT Patent Application No. PCT/US11/031767, 9 pages.
International Preliminary Report on Patentability issued Feb. 9, 2012 for PCT Patent Application No. PCT/US09/052227, 7 pages.
Office Action issued Dec. 31, 2012 for U.S. Appl. No. 13/406,730, 44 pages.
Australian Examination Report issued Sep. 28, 2012 for AU Patent Application No. 2008365249, 3 pages.
Office Action issued Dec. 31, 2012 for U.S. Appl. No. 13/422,666, 33 pages.
Office Action issued Jan. 10, 2013 for U.S. Appl. No. 12/831,716, 46 pages.
Schlumberger Oilfield Glossary entry for "skid" accessed Jan. 10, 2013 via www.glossary.oilfield.slb.com, 1 page.
Dictionary definitions of "integrate", "incorporate", and "rheology", accessed Jan. 10, 2013 via thefreedictionary.com, 3 pages.

* cited by examiner

PRESSURE AND FLOW CONTROL IN DRILLING OPERATIONS

CROSS-REFERENCE TO RELATED APPLICATIONS

The present application is a continuation of U.S. application Ser. No. 13/022,964 filed on 8 Feb. 2011, now U.S. Pat. No. 8,286,730 which claims the benefit under 35 USC §119 of the filing date of International Application No. PCT/US10/56433 filed Nov. 12, 2010, which is a continuation-in-part of prior U.S. patent application Ser. No. 12/638,012, filed 15 Dec. 2009 now U.S. Pat. No. 8,281,875. The entire disclosures of these prior applications are incorporated herein by this reference.

BACKGROUND

The present disclosure relates generally to equipment utilized and operations performed in conjunction with well drilling operations and, in an embodiment described herein, more particularly provides for pressure and flow control in drilling operations.

Managed pressure drilling is well known as the art of precisely controlling bottom hole pressure during drilling by utilizing a closed annulus and a means for regulating pressure in the annulus. The annulus is typically closed during drilling through use of a rotating control device (RCD, also known as a rotating control head or rotating blowout preventer) which seals about the drill pipe as it rotates.

The means for regulating pressure in the annulus can include a choke interconnected in the mud return line and, in some applications, a backpressure pump to apply pressure to the annulus while connections are made in the drill pipe string. Unfortunately, sensors or other sources of actual parameter values can fail or otherwise lose communication with control systems used to regulate pressure during the drilling operation.

Therefore, it may be seen that improvements are needed in the art of controlling pressure and flow in drilling operations.

DETAILED DESCRIPTION

Figure 1:
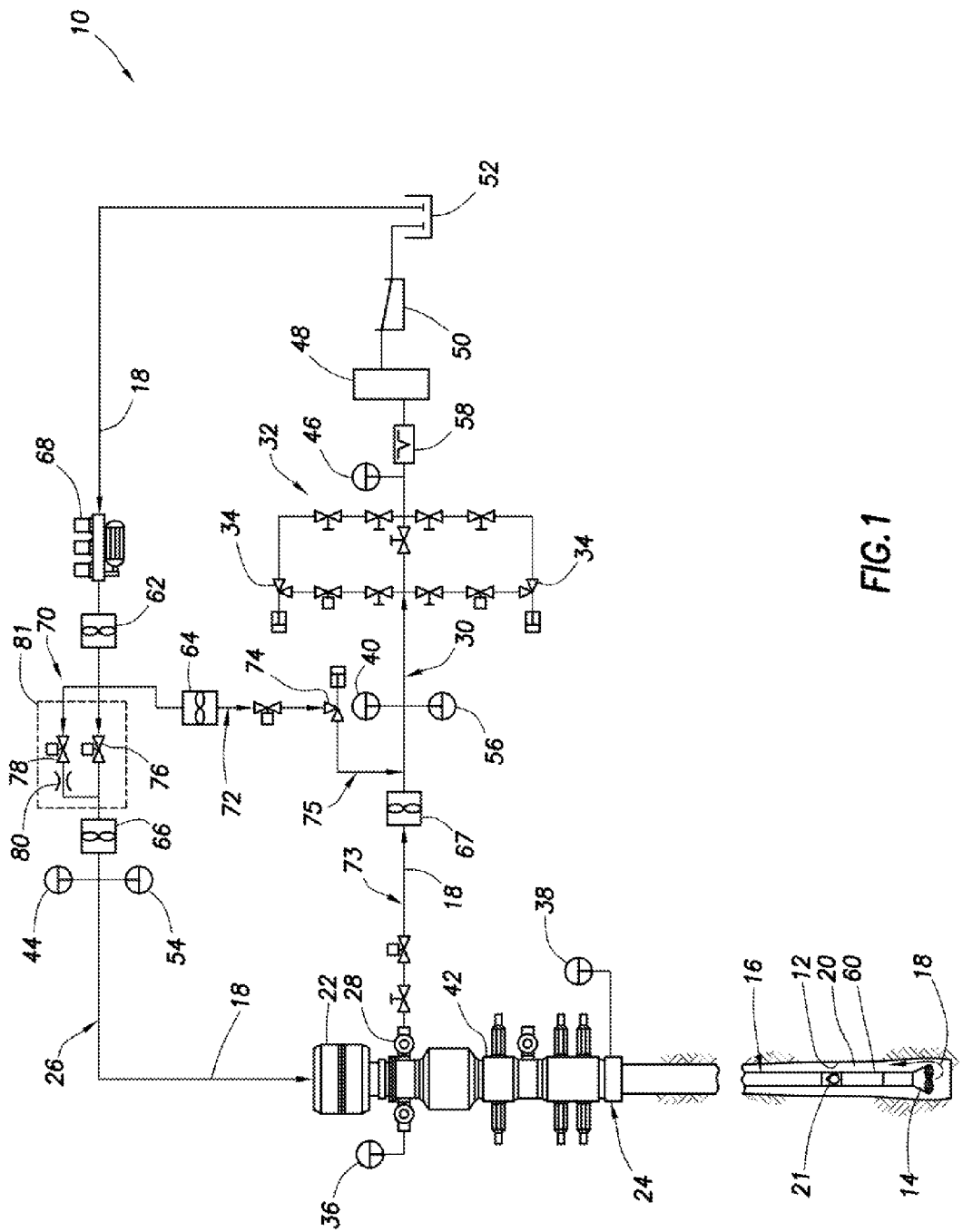
FIG. 1 is a schematic view of a well drilling system and method embodying principles of the present disclosure.

Representatively and schematically illustrated in FIG. 1 is a well drilling system 10 and associated method which can embody principles of the present disclosure. In the system 10, a wellbore 12 is drilled by rotating a drill bit 14 on an end of a drill string 16. Drilling fluid 18, commonly known as mud, is circulated downward through the drill string 16, out the drill bit 14 and upward through an annulus 20 formed between the drill string and the wellbore 12, in order to cool the drill bit, lubricate the drill string, remove cuttings and provide a measure of bottom hole pressure control. A non-return valve 21 (typically a flapper-type check valve) prevents flow of the drilling fluid 18 upward through the drill string 16 (e.g., when connections are being made in the drill string).

Control of bottom hole pressure is very important in managed pressure drilling, and in other types of drilling operations. Preferably, the bottom hole pressure is precisely controlled to prevent excessive loss of fluid into the earth formation surrounding the wellbore 12, undesired fracturing of the formation, undesired influx of formation fluids into the wellbore, etc. In typical managed pressure drilling, it is desired to maintain the bottom hole pressure just slightly greater than a pore pressure of the formation, without exceeding a fracture pressure of the formation. In typical underbalanced drilling, it is desired to maintain the bottom hole pressure somewhat less than the pore pressure, thereby obtaining a controlled influx of fluid from the formation. In typical overbalanced drilling, it is desired to maintain the bottom hole pressure somewhat greater than the pore pressure, thereby preventing (or at least limiting) influx of fluid from the formation.

Nitrogen or another gas, or another lighter weight fluid, may be added to the drilling fluid 18 for pressure control. This technique is useful, for example, in underbalanced drilling operations.

In the system 10, additional control over the bottom hole pressure is obtained by closing off the annulus 20 (e.g., isolating it from communication with the atmosphere and enabling the annulus to be pressurized at or near the surface) using a rotating control device 22 (RCD). The RCD 22 seals about the drill string 16 above a wellhead 24. Although not shown in FIG. 1, the drill string 16 would extend upwardly through the RCD 22 for connection to, for example, a rotary table (not shown), a standpipe line 26, kelley (not shown), a top drive and/or other conventional drilling equipment.

The drilling fluid 18 exits the wellhead 24 via a wing valve 28 in communication with the annulus 20 below the RCD 22. The fluid 18 then flows through mud return lines 30, 73 to a choke manifold 32, which includes redundant chokes 34 (only one of which might be used at a time). Backpressure is applied to the annulus 20 by variably restricting flow of the fluid 18 through the operative choke(s) 34.

The greater the restriction to flow through the choke 34, the greater the backpressure applied to the annulus 20. Thus, downhole pressure (e.g., pressure at the bottom of the wellbore 12, pressure at a downhole casing shoe, pressure at a particular formation or zone, etc.) can be conveniently regulated by varying the backpressure applied to the annulus 20. A hydraulics model can be used, as described more fully below, to determine a pressure applied to the annulus 20 at or near the surface which will result in a desired downhole pressure, so that an operator (or an automated control system) can readily determine how to regulate the pressure applied to the annulus at or near the surface (which can be conveniently measured) in order to obtain the desired downhole pressure.

Pressure applied to the annulus 20 can be measured at or near the surface via a variety of pressure sensors 36, 38, 40, each of which is in communication with the annulus. Pressure sensor 36 senses pressure below the RCD 22, but above a blowout preventer (BOP) stack 42. Pressure sensor 38 senses pressure in the wellhead below the BOP stack 42. Pressure sensor 40 senses pressure in the mud return lines 30, 73 upstream of the choke manifold 32.

Another pressure sensor 44 senses pressure in the standpipe line 26. Yet another pressure sensor 46 senses pressure downstream of the choke manifold 32, but upstream of a separator 48, shaker 50 and mud pit 52. Additional sensors include temperature sensors 54, 56, Coriolis flowmeter 58, and flowmeters 62, 64, 66.

Not all of these sensors are necessary. For example, the system 10 could include only two of the three flowmeters 62, 64, 66. However, input from all available sensors is useful to the hydraulics model in determining what the pressure applied to the annulus 20 should be during the drilling operation.

Other sensor types may be used, if desired. For example, it is not necessary for the flowmeter 58 to be a Coriolis flowmeter, since a turbine flowmeter, acoustic flowmeter, or another type of flowmeter could be used instead.

In addition, the drill string 16 may include its own sensors 60, for example, to directly measure downhole pressure. Such sensors 60 may be of the type known to those skilled in the art as pressure while drilling (PWD), measurement while drilling (MWD) and/or logging while drilling (LWD). These drill string sensor systems generally provide at least pressure measurement, and may also provide temperature measurement, detection of drill string characteristics (such as vibration, weight on bit, stick-slip, etc.), formation characteristics (such as resistivity, density, etc.) and/or other measurements. Various forms of wired or wireless telemetry (acoustic, pressure pulse, electromagnetic, etc.) may be used to transmit the downhole sensor measurements to the surface.

Additional sensors could be included in the system 10, if desired. For example, another flowmeter 67 could be used to measure the rate of flow of the fluid 18 exiting the wellhead 24, another Coriolis flowmeter (not shown) could be interconnected directly upstream or downstream of a rig mud pump 68, etc.

Fewer sensors could be included in the system 10, if desired. For example, the output of the rig mud pump 68 could be determined by counting pump strokes, instead of by using flowmeter 62 or any other flowmeters.

Note that the separator 48 could be a 3 or 4 phase separator, or a mud gas separator (sometimes referred to as a "poor boy degasser"). However, the separator 48 is not necessarily used in the system 10.

The drilling fluid 18 is pumped through the standpipe line 26 and into the interior of the drill string 16 by the rig mud pump 68. The pump 68 receives the fluid 18 from the mud pit 52 and flows it via a standpipe manifold 70 to the standpipe 26, the fluid then circulates downward through the drill string 16, upward through the annulus 20, through the mud return lines 30, 73, through the choke manifold 32, and then via the separator 48 and shaker 50 to the mud pit 52 for conditioning and recirculation.

Note that, in the system 10 as so far described above, the choke 34 cannot be used to control backpressure applied to the annulus 20 for control of the downhole pressure, unless the fluid 18 is flowing through the choke. In conventional overbalanced drilling operations, a lack of fluid 18 flow will occur whenever a connection is made in the drill string 16 (e.g., to add another length of drill pipe to the drill string as the wellbore 12 is drilled deeper), and the lack of circulation will require that downhole pressure be regulated solely by the density of the fluid 18.

In the system 10, however, flow of the fluid 18 through the choke 34 can be maintained, even though the fluid does not circulate through the drill string 16 and annulus 20, while a connection is being made in the drill string. Thus, pressure can still be applied to the annulus 20 by restricting flow of the fluid 18 through the choke 34, even though a separate backpressure pump may not be used.

Instead, the fluid 18 is flowed from the pump 68 to the choke manifold 32 via a bypass line 72, 75 when a connection is made in the drill string 16. Thus, the fluid 18 can bypass the standpipe line 26, drill string 16 and annulus 20, and can flow directly from the pump 68 to the mud return line 30, which remains in communication with the annulus 20. Restriction of this flow by the choke 34 will thereby cause pressure to be applied to the annulus 20 (for example, in typical managed pressure drilling).

As depicted in FIG. 1, both of the bypass line 75 and the mud return line 30 are in communication with the annulus 20 via a single line 73. However, the bypass line 75 and the mud return line 30 could instead be separately connected to the wellhead 24, for example, using an additional wing valve (e.g., below the RCD 22), in which case each of the lines 30, 75 would be directly in communication with the annulus 20. Although this might require some additional plumbing at the rig site, the effect on the annulus pressure would be essentially the same as connecting the bypass line 75 and the mud return line 30 to the common line 73. Thus, it should be appreciated that various different configurations of the components of the system 10 may be used, without departing from the principles of this disclosure.

Flow of the fluid 18 through the bypass line 72, 75 is regulated by a choke or other type of flow control device 74. Line 72 is upstream of the bypass flow control device 74, and line 75 is downstream of the bypass flow control device.

Flow of the fluid 18 through the standpipe line 26 is substantially controlled by a valve or other type of flow control device 76. Note that the flow control devices 74, 76 are independently controllable, which provides substantial benefits to the system 10, as described more fully below.

Since the rate of flow of the fluid 18 through each of the standpipe and bypass lines 26, 72 is useful in determining how bottom hole pressure is affected by these flows, the flowmeters 64, 66 are depicted in FIG. 1 as being interconnected in these lines. However, the rate of flow through the standpipe line 26 could be determined even if only the flowmeters 62, 64 were used, and the rate of flow through the bypass line 72 could be determined even if only the flowmeters 62, 66 were used. Thus, it should be understood that it is not necessary for the system 10 to include all of the sensors depicted in FIG. 1 and described herein, and the system could instead include additional sensors, different combinations and/or types of sensors, etc.

In another beneficial feature of the system 10, a bypass flow control device 78 and flow restrictor 80 may be used for filling the standpipe line 26 and drill string 16 after a connection is made in the drill string, and for equalizing pressure between the standpipe line and mud return lines 30, 73 prior to opening the flow control device 76. Otherwise, sudden opening of the flow control device 76 prior to the standpipe line 26 and drill string 16 being filled and pressurized with the fluid 18 could cause an undesirable pressure transient in the annulus 20 (e.g., due to flow to the choke manifold 32 temporarily being lost while the standpipe line and drill string fill with fluid, etc.).

By opening the standpipe bypass flow control device 78 after a connection is made, the fluid 18 is permitted to fill the standpipe line 26 and drill string 16 while a substantial majority of the fluid continues to flow through the bypass line 72, thereby enabling continued controlled application of pressure to the annulus 20. After the pressure in the standpipe line 26 has equalized with the pressure in the mud return lines 30, 73 and bypass line 75, the flow control device 76 can be opened, and then the flow control device 74 can be closed to slowly divert a greater proportion of the fluid 18 from the bypass line 72 to the standpipe line 26.

Before a connection is made in the drill string 16, a similar process can be performed, except in reverse, to gradually divert flow of the fluid 18 from the standpipe line 26 to the bypass line 72 in preparation for adding more drill pipe to the drill string 16. That is, the flow control device 74 can be gradually opened to slowly divert a greater proportion of the fluid 18 from the standpipe line 26 to the bypass line 72, and then the flow control device 76 can be closed.

Note that the flow control device 78 and flow restrictor 80 could be integrated into a single element (e.g., a flow control device having a flow restriction therein), and the flow control devices 76, 78 could be integrated into a single flow control device 81 (e.g., a single choke which can gradually open to slowly fill and pressurize the standpipe line 26 and drill string 16 after a drill pipe connection is made, and then open fully to allow maximum flow while drilling).

However, since typical conventional drilling rigs are equipped with the flow control device 76 in the form of a valve in the standpipe manifold 70, and use of the standpipe valve is incorporated into usual drilling practices, the individually operable flow control devices 76, 78 are presently preferred. The flow control devices 76, 78 are at times referred to collectively below as though they are the single flow control device 81, but it should be understood that the flow control device 81 can include the individual flow control devices 76, 78.

Figure 2:
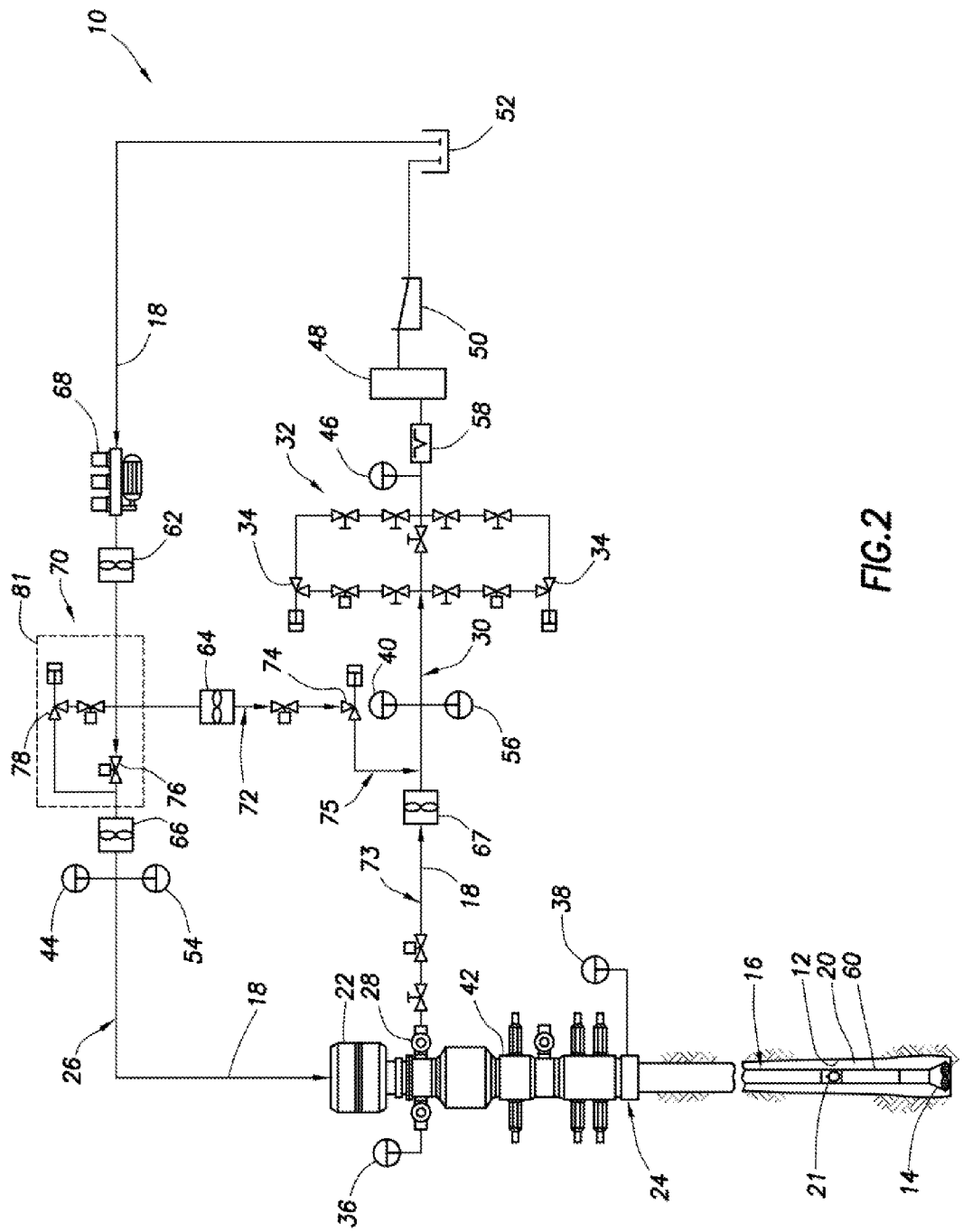
FIG. 2 is a schematic view of another configuration of the well drilling system.

Another alternative is representatively illustrated in FIG. 2. In this configuration of the system 10, the flow control device 78 is in the form of a choke, and the flow restrictor 80 is not used. The flow control device 78 depicted in FIG. 2 enables more precise control over the flow of the fluid 18 into the standpipe line 26 and drill string 16 after a drill pipe connection is made.

Note that each of the flow control devices 74, 76, 78 and chokes 34 are preferably remotely and automatically controllable to maintain a desired downhole pressure by maintaining a desired annulus pressure at or near the surface. However, any one or more of these flow control devices 74, 76, 78 and chokes 34 could be manually controlled without departing from the principles of this disclosure.

Figure 3:
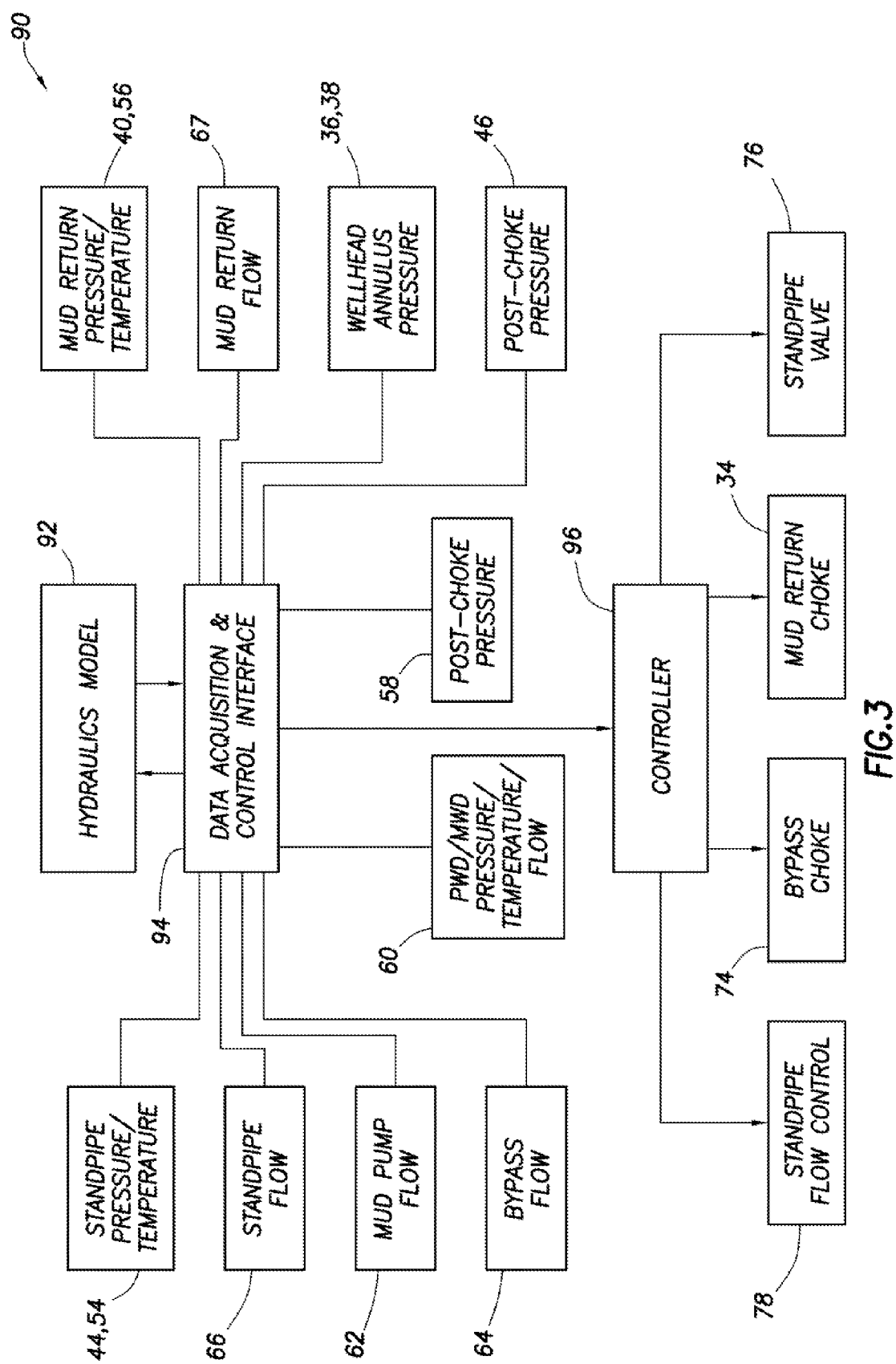
FIG. 3 is a schematic block diagram of a pressure and flow control system which may be used in the well drilling system and method.

A pressure and flow control system 90 which may be used in conjunction with the system 10 and associated methods of FIGS. 1 & 2 is representatively illustrated in FIG. 3. The control system 90 is preferably fully automated, although some human intervention may be used, for example, to safeguard against improper operation, initiate certain routines, update parameters, etc.

The control system 90 includes a hydraulics model 92, a data acquisition and control interface 94 and a controller 96 (such as a programmable logic controller or PLC, a suitably programmed computer, etc.). Although these elements 92, 94, 96 are depicted separately in FIG. 3, any or all of them could be combined into a single element, or the functions of the elements could be separated into additional elements, other additional elements and/or functions could be provided, etc.

The hydraulics model 92 is used in the control system 90 to determine the desired annulus pressure at or near the surface to achieve the desired downhole pressure. Data such as well geometry, fluid properties and offset well information (such as geothermal gradient and pore pressure gradient, etc.) are utilized by the hydraulics model 92 in making this determination, as well as real-time sensor data acquired by the data acquisition and control interface 94.

Thus, there is a continual two-way transfer of data and information between the hydraulics model 92 and the data acquisition and control interface 94. It is important to appreciate that the data acquisition and control interface 94 operates to maintain a substantially continuous flow of real-time data from the sensors 44, 54, 66, 62, 64, 60, 58, 46, 36, 38, 40, 56, 67 to the hydraulics model 92, so that the hydraulics model has the information it needs to adapt to changing circumstances and to update the desired annulus pressure, and the hydraulics model operates to supply the data acquisition and control interface substantially continuously with a value for the desired annulus pressure.

A suitable hydraulics model for use as the hydraulics model 92 in the control system 90 is REAL TIME HYDRAULICS™ provided by Halliburton Energy Services, Inc. of Houston, Tex. USA. Another suitable hydraulics model is provided under the trade name IRIS™, and yet another is available from SINTEF of Trondheim, Norway. Any suitable hydraulics model may be used in the control system 90 in keeping with the principles of this disclosure.

A suitable data acquisition and control interface for use as the data acquisition and control interface 94 in the control system 90 are SENTRY™ and INSITE™ provided by Halliburton Energy Services, Inc. Any suitable data acquisition and control interface may be used in the control system 90 in keeping with the principles of this disclosure.

The controller 96 operates to maintain a desired setpoint annulus pressure by controlling operation of the mud return choke 34. When an updated desired annulus pressure is transmitted from the data acquisition and control interface 94 to the controller 96, the controller uses the desired annulus pressure as a setpoint and controls operation of the choke 34 in a manner (e.g., increasing or decreasing flow resistance through the choke as needed) to maintain the setpoint pressure in the annulus 20. The choke 34 can be closed more to increase flow resistance, or opened more to decrease flow resistance.

Maintenance of the setpoint pressure is accomplished by comparing the setpoint pressure to a measured annulus pressure (such as the pressure sensed by any of the sensors 36, 38, 40), and decreasing flow resistance through the choke 34 if the measured pressure is greater than the setpoint pressure, and increasing flow resistance through the choke if the measured pressure is less than the setpoint pressure. Of course, if the setpoint and measured pressures are the same, then no adjustment of the choke 34 is required. This process is preferably automated, so that no human intervention is required, although human intervention may be used if desired.

The controller 96 may also be used to control operation of the standpipe flow control devices 76, 78 and the bypass flow control device 74. The controller 96 can, thus, be used to automate the processes of diverting flow of the fluid 18 from the standpipe line 26 to the bypass line 72 prior to making a connection in the drill string 16, then diverting flow from the bypass line to the standpipe line after the connection is made, and then resuming normal circulation of the fluid 18 for drilling. Again, no human intervention may be required in these automated processes, although human intervention may be used if desired, for example, to initiate each process in turn, to manually operate a component of the system, etc.

Figure 4:
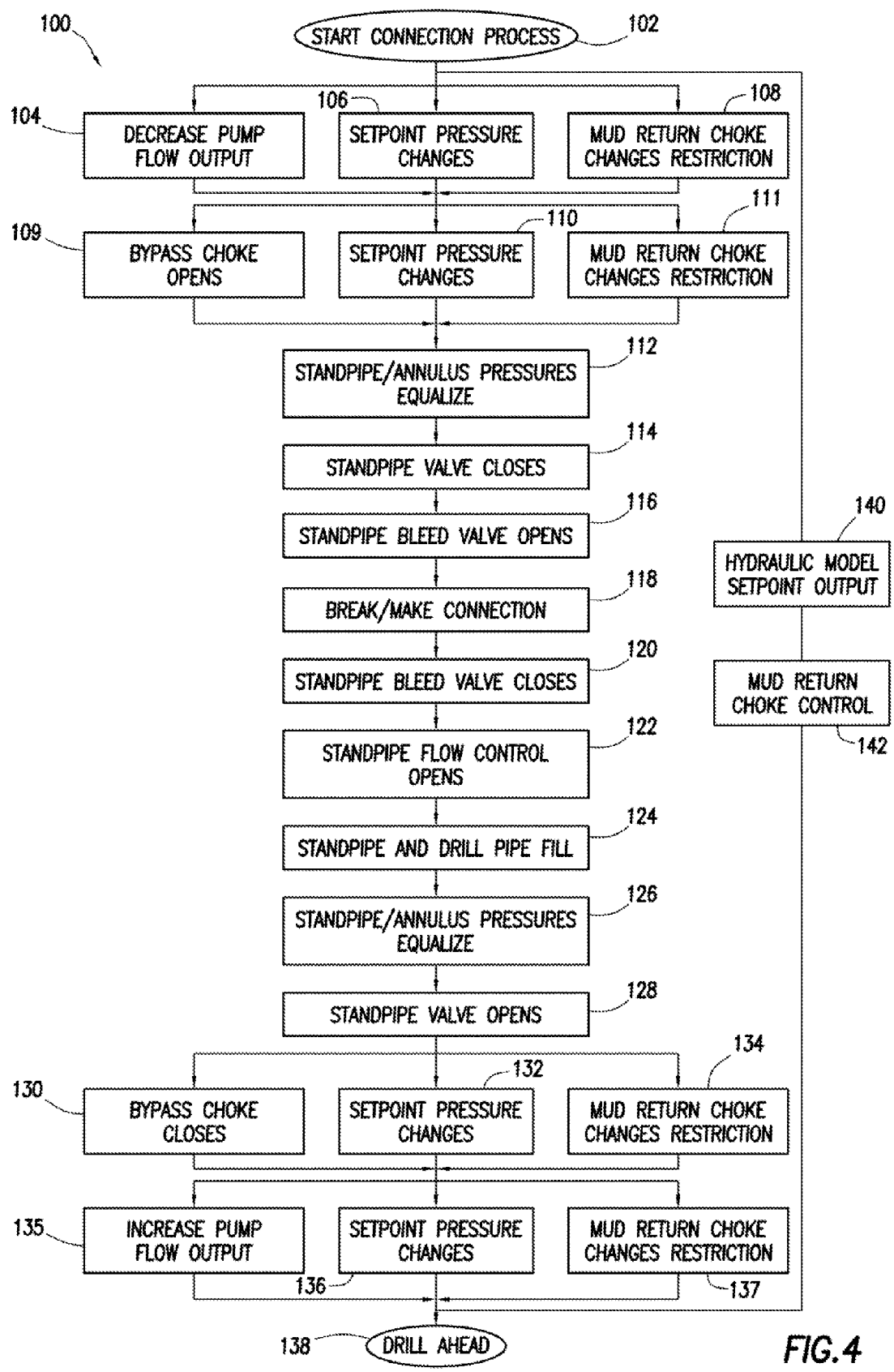
FIG. 4 is a flowchart of a method for making a drill string connection which may be used in the well drilling system and method.

Referring additionally now to FIG. 4, a schematic flowchart is provided for a method 100 for making a drill pipe connection in the well drilling system 10 using the control system 90. Of course, the method 100 may be used in other well drilling systems, and with other control systems, in keeping with the principles of this disclosure.

The drill pipe connection process begins at step 102, in which the process is initiated. A drill pipe connection is typically made when the wellbore 12 has been drilled far enough that the drill string 16 must be elongated in order to drill further.

In step 104, the flow rate output of the pump 68 may be decreased. By decreasing the flow rate of the fluid 18 output from the pump 68, it is more convenient to maintain the choke 34 within its most effective operating range (typically, from about 30% to about 70% of maximum opening) during the connection process. However, this step is not necessary if, for example, the choke 34 would otherwise remain within its effective operating range.

In step 106, the setpoint pressure changes due to the reduced flow of the fluid 18 (e.g., to compensate for decreased fluid friction in the annulus 20 between the bit 14 and the wing valve 28 resulting in reduced equivalent circulating density). The data acquisition and control interface 94 receives indications (e.g., from the sensors 58, 60, 62, 66, 67) that the flow rate of the fluid 18 has decreased, and the hydraulics model 92 in response determines that a changed annulus pressure is desired to maintain the desired downhole pressure, and the controller 96 uses the changed desired annulus pressure as a setpoint to control operation of the choke 34.

In a slightly overbalanced managed pressure drilling operation, the setpoint pressure would likely increase, due to the reduced equivalent circulating density, in which case flow resistance through the choke 34 would be increased in response. However, in some operations (such as, underbalanced drilling operations in which gas or another light weight fluid is added to the drilling fluid 18 to decrease bottom hole pressure), the setpoint pressure could decrease (e.g., due to production of liquid downhole).

In step 108, the restriction to flow of the fluid 18 through the choke 34 is changed, due to the changed desired annulus pressure in step 106. As discussed above, the controller 96 controls operation of the choke 34, in this case changing the restriction to flow through the choke to obtain the changed setpoint pressure. Also as discussed above, the setpoint pressure could increase or decrease.

Steps 104, 106 and 108 are depicted in the FIG. 4 flowchart as being performed concurrently, since the setpoint pressure and mud return choke restriction can continuously vary, whether in response to each other, in response to the change in the mud pump output and in response to other conditions, as discussed above.

In step 109, the bypass flow control device 74 gradually opens. This diverts a gradually increasing proportion of the fluid 18 to flow through the bypass line 72, instead of through the standpipe line 26.

In step 110, the setpoint pressure changes due to the reduced flow of the fluid 18 through the drill string 16 (e.g., to compensate for decreased fluid friction in the annulus 20 between the bit 14 and the wing valve 28 resulting in reduced equivalent circulating density). Flow through the drill string 16 is substantially reduced when the bypass flow control device 74 is opened, since the bypass line 72 becomes the path of least resistance to flow. The data acquisition and control interface 94 receives indications (e.g., from the sensors 58, 60, 62, 66, 67) that the flow rate of the fluid 18 through the drill pipe 16 and annulus 20 has decreased, and the hydraulics model 92 in response determines that a changed annulus pressure is desired to maintain the desired downhole pressure, and the controller 96 uses the changed desired annulus pressure as a setpoint to control operation of the choke 34.

In a slightly overbalanced managed pressure drilling operation, the setpoint pressure would likely increase, due to the reduced equivalent circulating density, in which case flow restriction through the choke 34 would be increased in response. However, in some operations (such as, underbalanced drilling operations in which gas or another light weight fluid is added to the drilling fluid 18 to decrease bottom hole pressure), the setpoint pressure could decrease (e.g., due to production of liquid downhole).

In step 111, the restriction to flow of the fluid 18 through the choke 34 is changed, due to the changed desired annulus pressure in step 110. As discussed above, the controller 96 controls operation of the choke 34, in this case changing the restriction to flow through the choke to obtain the changed setpoint pressure. Also as discussed above, the setpoint pressure could increase or decrease.

Steps 109, 110 and 111 are depicted in the FIG. 4 flowchart as being performed concurrently, since the setpoint pressure and mud return choke restriction can continuously vary, whether in response to each other, in response to the bypass flow control device 74 opening and in response to other conditions, as discussed above. However, these steps could be performed non-concurrently in other examples.

In step 112, the pressures in the standpipe line 26 and the annulus 20 at or near the surface (indicated by sensors 36, 38, 40, 44) equalize. At this point, the bypass flow control device 74 should be fully open, and substantially all of the fluid 18 is flowing through the bypass line 72, 75 and not through the standpipe line 26 (since the bypass line represents the path of least resistance). Static pressure in the standpipe line 26 should substantially equalize with pressure in the lines 30, 73, 75 upstream of the choke manifold 32.

In step 114, the standpipe flow control device 81 is closed. The separate standpipe bypass flow control device 78 should already be closed, in which case only the valve 76 would be closed in step 114.

In step 116, a standpipe bleed valve (not shown) would be opened to bleed pressure and fluid from the standpipe line 26 in preparation for breaking the connection between the kelley or top drive and the drill string 16. At this point, the standpipe line 26 is vented to atmosphere.

In step 118, the kelley or top drive is disconnected from the drill string 16, another stand of drill pipe is connected to the drill string, and the kelley or top drive is connected to the top of the drill string. This step is performed in accordance with conventional drilling practice, with at least one exception, in that it is conventional drilling practice to turn the rig pumps off while making a connection. In the method 100, however, the rig pumps 68 preferably remain on, but the standpipe valve 76 is closed and all flow is diverted to the choke manifold 32 for annulus pressure control. Non-return valve 21 prevents flow upward through the drill string 16 while making a connection with the rig pumps 68 on.

In step 120, the standpipe bleed valve is closed. The standpipe line 26 is, thus, isolated again from atmosphere, but the standpipe line and the newly added stand of drill pipe are substantially empty (i.e., not filled with the fluid 18) and the pressure therein is at or near ambient pressure before the connection is made.

In step 122, the standpipe bypass flow control device 78 opens (in the case of the valve and flow restrictor configuration of FIG. 1) or gradually opens (in the case of the choke configuration of FIG. 2). In this manner, the fluid 18 is allowed to fill the standpipe line 26 and the newly added stand of drill pipe, as indicated in step 124.

Eventually, the pressure in the standpipe line 26 will equalize with the pressure in the annulus 20 at or near the surface, as indicated in step 126. However, substantially all of the fluid 18 will still flow through the bypass line 72 at this point. Static pressure in the standpipe line 26 should substantially equalize with pressure in the lines 30, 73, 75 upstream of the choke manifold 32.

In step 128, the standpipe flow control device 76 is opened in preparation for diverting flow of the fluid 18 to the standpipe line 26 and thence through the drill string 16. The standpipe bypass flow control device 78 is then closed. Note that, by previously filling the standpipe line 26 and drill string 16, and equalizing pressures between the standpipe line and the annulus 20, the step of opening the standpipe flow control device 76 does not cause any significant undesirable pressure transients in the annulus or mud return lines 30, 73. Substantially all of the fluid 18 still flows through the bypass line 72, instead of through the standpipe line 26, even though the standpipe flow control device 76 is opened.

Considering the separate standpipe flow control devices 76, 78 as a single standpipe flow control device 81, then the flow control device 81 is gradually opened to slowly fill the standpipe line 26 and drill string 16, and then fully opened when pressures in the standpipe line and annulus 20 are substantially equalized.

In step 130, the bypass flow control device 74 is gradually closed, thereby diverting an increasingly greater proportion of the fluid 18 to flow through the standpipe line 26 and drill string 16, instead of through the bypass line 72. During this step, circulation of the fluid 18 begins through the drill string 16 and wellbore 12.

In step 132, the setpoint pressure changes due to the flow of the fluid 18 through the drill string 16 and annulus 20 (e.g., to compensate for increased fluid friction resulting in increased equivalent circulating density). The data acquisition and control interface 94 receives indications (e.g., from the sensors 60, 64, 66, 67) that the flow rate of the fluid 18 through the wellbore 12 has increased, and the hydraulics model 92 in response determines that a changed annulus pressure is desired to maintain the desired downhole pressure, and the controller 96 uses the changed desired annulus pressure as a setpoint to control operation of the choke 34. The desired annulus pressure may either increase or decrease, as discussed above for steps 106 and 108.

In step 134, the restriction to flow of the fluid 18 through the choke 34 is changed, due to the changed desired annulus pressure in step 132. As discussed above, the controller 96 controls operation of the choke 34, in this case changing the restriction to flow through the choke to obtain the changed setpoint pressure.

Steps 130, 132 and 134 are depicted in the FIG. 4 flowchart as being performed concurrently, since the setpoint pressure and mud return choke restriction can continuously vary, whether in response to each other, in response to the bypass flow control device 74 closing and in response to other conditions, as discussed above.

In step 135, the flow rate output from the pump 68 may be increased in preparation for resuming drilling of the wellbore 12. This increased flow rate maintains the choke 34 in its optimum operating range, but this step (as with step 104 discussed above) may not be used if the choke is otherwise maintained in its optimum operating range.

In step 136, the setpoint pressure changes due to the increased flow of the fluid 18 (e.g., to compensate for increased fluid friction in the annulus 20 between the bit 14 and the wing valve 28 resulting in increased equivalent circulating density). The data acquisition and control interface 94 receives indications (e.g., from the sensors 58, 60, 62, 66, 67) that the flow rate of the fluid 18 has increased, and the hydraulics model 92 in response determines that a changed annulus pressure is desired to maintain the desired downhole pressure, and the controller 96 uses the changed desired annulus pressure as a setpoint to control operation of the choke 34.

In a slightly overbalanced managed pressure drilling operation, the setpoint pressure would likely decrease, due to the increased equivalent circulating density, in which case flow restriction through the choke 34 would be decreased in response.

In step 137, the restriction to flow of the fluid 18 through the choke 34 is changed, due to the changed desired annulus pressure in step 136. As discussed above, the controller 96 controls operation of the choke 34, in this case changing the restriction to flow through the choke to obtain the changed setpoint pressure. Also as discussed above, the setpoint pressure could increase or decrease.

Steps 135, 136 and 137 are depicted in the FIG. 4 flowchart as being performed concurrently, since the setpoint pressure and mud return choke restriction can continuously vary, whether in response to each other, in response to the change in the mud pump output and in response to other conditions, as discussed above.

In step 138, drilling of the wellbore 12 resumes. When another connection is needed in the drill string 16, the steps 102-138 can be repeated.

Steps 140 and 142 are included in the FIG. 4 flowchart for the connection method 100 to emphasize that the control system 90 continues to operate throughout the method. That is, the data acquisition and control interface 94 continues to receive data from the sensors 36, 38, 40, 44, 46, 54, 56, 58, 62, 64, 66, 67 and supplies appropriate data to the hydraulics model 92. The hydraulics model 92 continues to determine the desired annulus pressure corresponding to the desired downhole pressure. The controller 96 continues to use the desired annulus pressure as a setpoint pressure for controlling operation of the choke 34.

It will be appreciated that all or most of the steps described above may be conveniently automated using the control system 90. For example, the controller 96 may be used to control operation of any or all of the flow control devices 34, 74, 76, 78, 81 automatically in response to input from the data acquisition and control interface 94.

Human intervention would preferably be used to indicate to the control system 90 when it is desired to begin the connection process (step 102), and then to indicate when a drill pipe connection has been made (step 118), but substantially all of the other steps could be automated (i.e., by suitably programming the software elements of the control system 90). However, it is envisioned that all of the steps 102-142 can be automated, for example, if a suitable top drive drilling rig (or any other drilling rig which enables drill pipe connections to be made without human intervention) is used.

Figure 5:
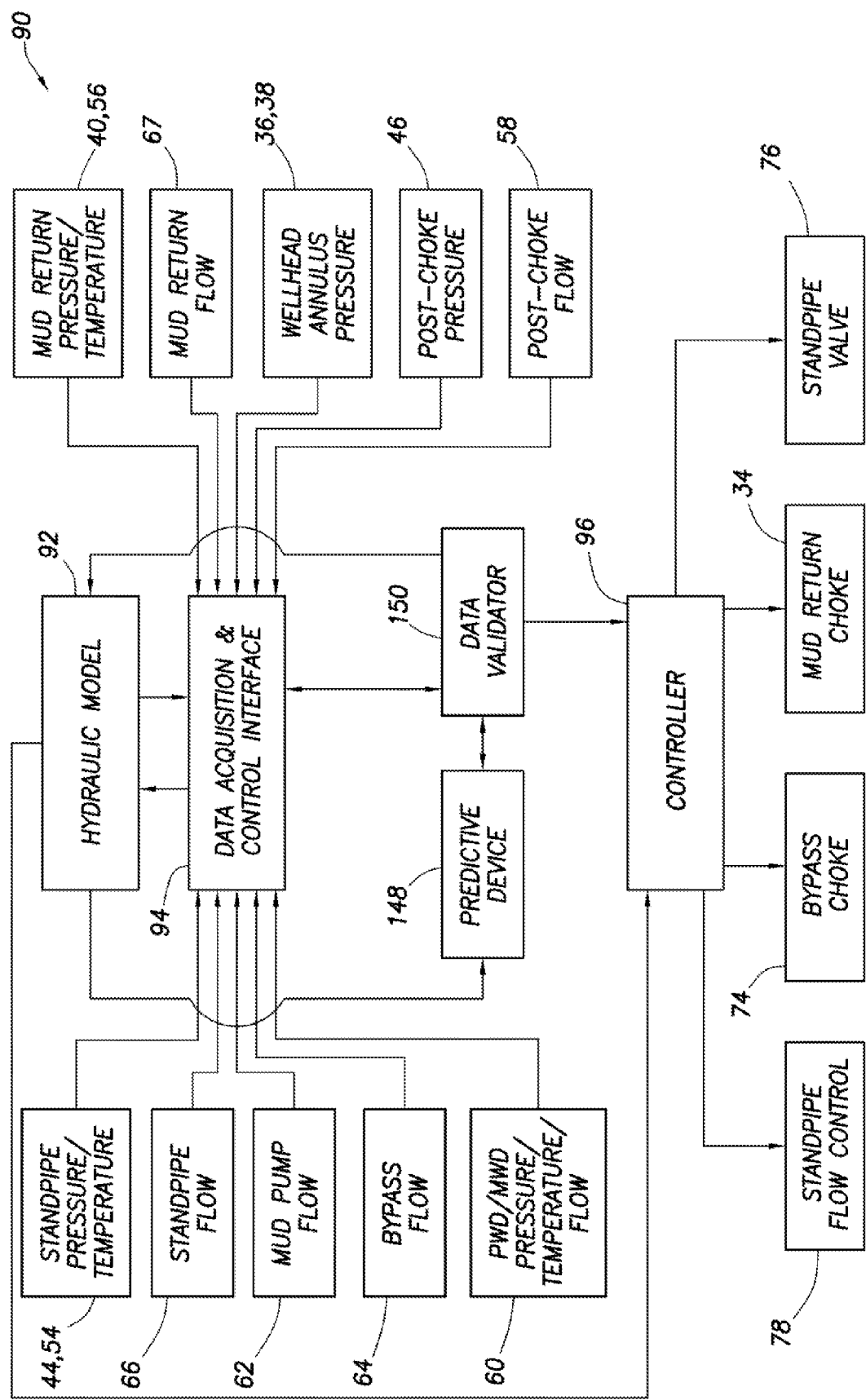
FIG. 5 is a schematic view of another configuration of the pressure and flow control system.

Referring additionally now to FIG. 5, another configuration of the control system 90 is representatively illustrated. The control system 90 of FIG. 5 is very similar to the control system of FIG. 3, but differs at least in that a predictive device 148 and a data validator 150 are included in the control system of FIG. 5.

The predictive device 148 preferably comprises one or more neural network models for predicting various well parameters. These parameters could include outputs of any of the sensors 36, 38, 40, 44, 46, 54, 56, 58, 60, 62, 64, 66, 67, the annulus pressure setpoint output from the hydraulic model 92, positions of flow control devices 34, 74, 76, 78, drilling fluid 18 density, etc. Any well parameter, and any combination of well parameters, may be predicted by the predictive device 148.

The predictive device 148 is preferably "trained" by inputting present and past actual values for the parameters to the predictive device. Terms or "weights" in the predictive device 148 may be adjusted based on derivatives of output of the predictive device with respect to the terms.

The predictive device 148 may be trained by inputting to the predictive device data obtained during drilling, while making connections in the drill string 16, and/or during other stages of an overall drilling operation. The predictive device 148 may be trained by inputting to the predictive device data obtained while drilling at least one prior wellbore.

The training may include inputting to the predictive device 148 data indicative of past errors in predictions produced by the predictive device. The predictive device 148 may be trained by inputting data generated by a computer simulation of the well drilling system 10 (including the drilling rig, the well, equipment utilized, etc.).

Once trained, the predictive device 148 can accurately predict or estimate what value one or more parameters should have in the present and/or future. The predicted parameter values can be supplied to the data validator 150 for use in its data validation processes.

The predictive device 148 does not necessarily comprise one or more neural network models. Other types of predictive devices which may be used include an artificial intelligence device, an adaptive model, a nonlinear function which generalizes for real systems, a genetic algorithm, a linear system model, and/or a nonlinear system model, combinations of these, etc.

The predictive device 148 may perform a regression analysis, perform regression on a nonlinear function and may utilize granular computing. An output of a first principle model may be input to the predictive device 148 and/or a first principle model may be included in the predictive device.

The predictive device 148 receives the actual parameter values from the data validator 150, which can include one or more digital programmable processors, memory, etc. The data validator 150 uses various pre-programmed algorithms to determine whether sensor measurements, flow control device positions, etc., received from the data acquisition & control interface 94 are valid.

For example, if a received actual parameter value is outside of an acceptable range, unavailable (e.g., due to a non-functioning sensor) or differs by more than a predetermined maximum amount from a predicted value for that parameter (e.g., due to a malfunctioning sensor), then the data validator 150 may flag that actual parameter value as being "invalid." Invalid parameter values may not be used for training the predictive device 148, or for determining the desired annulus pressure setpoint by the hydraulics model 92. Valid parameter values would be used for training the predictive device 148, for updating the hydraulics model 92, for recording to the data acquisition & control interface 94 database and, in the case of the desired annulus pressure setpoint, transmitted to the controller 96 for controlling operation of the flow control devices 34, 74, 76, 78.

The desired annulus pressure setpoint may be communicated from the hydraulics model 92 to each of the data acquisition & control interface 94, the predictive device 148 and the controller 96. The desired annulus pressure setpoint is communicated from the hydraulics model 92 to the data acquisition & control interface for recording in its database, and for relaying to the data validator 150 with the other actual parameter values.

The desired annulus pressure setpoint is communicated from the hydraulics model 92 to the predictive device 148 for use in predicting future annulus pressure setpoints. However, the predictive device 148 could receive the desired annulus pressure setpoint (along with the other actual parameter values) from the data validator 150 in other examples.

The desired annulus pressure setpoint is communicated from the hydraulics model 92 to the controller 96 for use in case the data acquisition & control interface 94 or data validator 150 malfunctions, or output from these other devices is otherwise unavailable. In that circumstance, the controller 96 could continue to control operation of the various flow control devices 34, 74, 76, 78 to maintain/achieve the desired pressure in the annulus 20 near the surface.

The predictive device 148 is trained in real time, and is capable of predicting current values of one or more sensor measurements based on the outputs of at least some of the other sensors. Thus, if a sensor output becomes unavailable, the predictive device 148 can supply the missing sensor measurement values to the data validator 150, at least temporarily, until the sensor output again becomes available.

If, for example, during the drill string connection process described above, one of the flowmeters 62, 64, 66 malfunctions, or its output is otherwise unavailable or invalid, then the data validator 150 can substitute the predicted flowmeter output for the actual (or nonexistent) flowmeter output. It is contemplated that, in actual practice, only one or two of the flowmeters 62, 64, 66 may be used. Thus, if the data validator 150 ceases to receive valid output from one of those flowmeters, determination of the proportions of fluid 18 flowing through the standpipe line 26 and bypass line 72 could not be readily accomplished, if not for the predicted parameter values output by the predictive device 148. It will be appreciated that measurements of the proportions of fluid 18 flowing through the standpipe line 26 and bypass line 72 are very useful, for example, in calculating equivalent circulating density and/or friction pressure by the hydraulics model 92 during the drill string connection process.

Validated parameter values are communicated from the data validator 150 to the hydraulics model 92 and to the controller 96. The hydraulics model 92 utilizes the validated parameter values, and possibly other data streams, to compute the pressure currently present downhole at the point of interest (e.g., at the bottom of the wellbore 12, at a problematic zone, at a casing shoe, etc.), and the desired pressure in the annulus 20 near the surface needed to achieve a desired downhole pressure.

The data validator 150 is programmed to examine the individual parameter values received from the data acquisition & control interface 94 and determine if each falls into a predetermined range of expected values. If the data validator 150 detects that one or more parameter values it received from the data acquisition & control interface 94 is invalid, it may send a signal to the predictive device 148 to stop training the neural network model for the faulty sensor, and to stop training the other models which rely upon parameter values from the faulty sensor to train.

Although the predictive device 148 may stop training one or more neural network models when a sensor fails, it can continue to generate predictions for output of the faulty sensor or sensors based on other, still functioning sensor inputs to the predictive device. Upon identification of a faulty sensor, the data validator 150 can substitute the predicted sensor parameter values from the predictive device 148 to the controller 96 and the hydraulics model 92. Additionally, when the data validator 150 determines that a sensor is malfunctioning or its output is unavailable, the data validator can generate an alarm and/or post a warning, identifying the malfunctioning sensor, so that an operator can take corrective action.

The predictive device 148 is preferably also able to train a neural network model representing the output of the hydraulics model 92. A predicted value for the desired annulus pressure setpoint is communicated to the data validator 150. If the hydraulics model 92 has difficulties in generating proper values or is unavailable, the data validator 150 can substitute the predicted desired annulus pressure setpoint to the controller 96.

Figure 6:
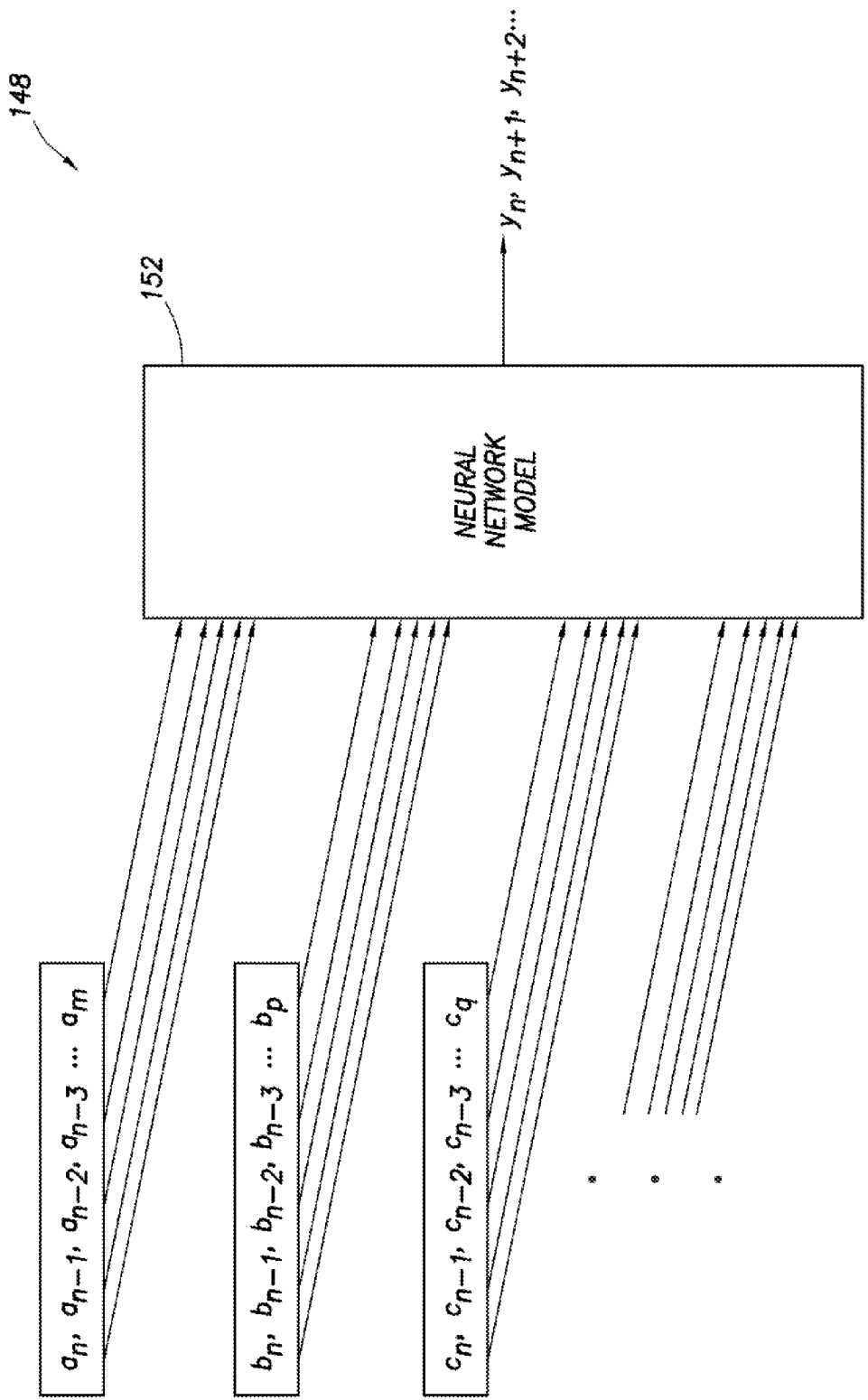
FIGS. 6-8 are schematic views of various configurations of a predictive device which may be used in the pressure and flow control system of FIG. 5.

Referring additionally now to FIG. 6, an example of the predictive device 148 is representatively illustrated, apart from the remainder of the control system 90. In this view, it may be seen that the predictive device 148 includes a neural network model 152 which outputs predicted current ($y_n$) and/or future ($y_{n+1}, y_{n+2}, \ldots$) values for a parameter y.

Various other current and/or past values for parameters a, b, c, ... are input to the neural network model 152 for training the neural network model, for predicting the parameter y values, etc. The parameters a, b, c, ..., y, ... may be any of the sensor measurements, flow control device positions, physical parameters (e.g., mud weight, wellbore depth, etc.), etc. described above.

Current and/or past actual and/or predicted values for the parameter y may also be input to the neural network model 152. Differences between the actual and predicted values for the parameter y can be useful in training the neural network model 152 (e.g., in minimizing the differences between the actual and predicted values).

During training, weights are assigned to the various input parameters and those weights are automatically adjusted such that the differences between the actual and predicted parameter values are minimized. If the underlying structure of the neural network model 152 and the input parameters are properly chosen, training should result in very little difference between the actual parameter values and the predicted parameter values after a suitable (and preferably short) training time.

It can be useful for a single neural network model 152 to output predicted parameter values for only a single parameter. Multiple neural network models 152 can be used to predict values for respective multiple parameters. In this manner, if one of the neural network models 152 fails, the others are not affected.

Figure 7:
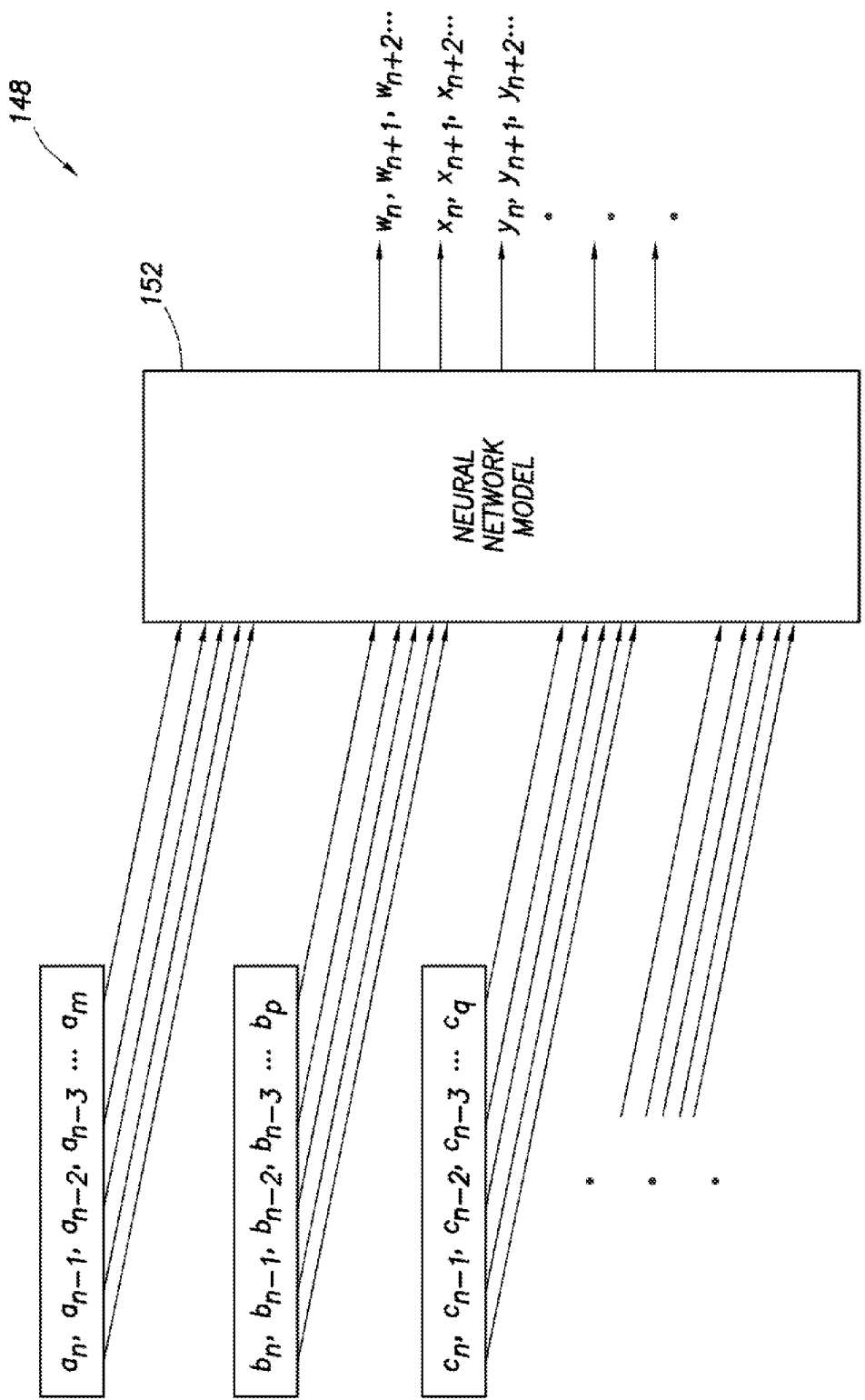

However, efficient utilization of resources might dictate that a single neural network model 152 be used to predict multiple parameter values. Such a configuration is representatively illustrated in FIG. 7, in which the neural network model 152 outputs predicted values for multiple parameters w, x, y . . . .

Figure 8:
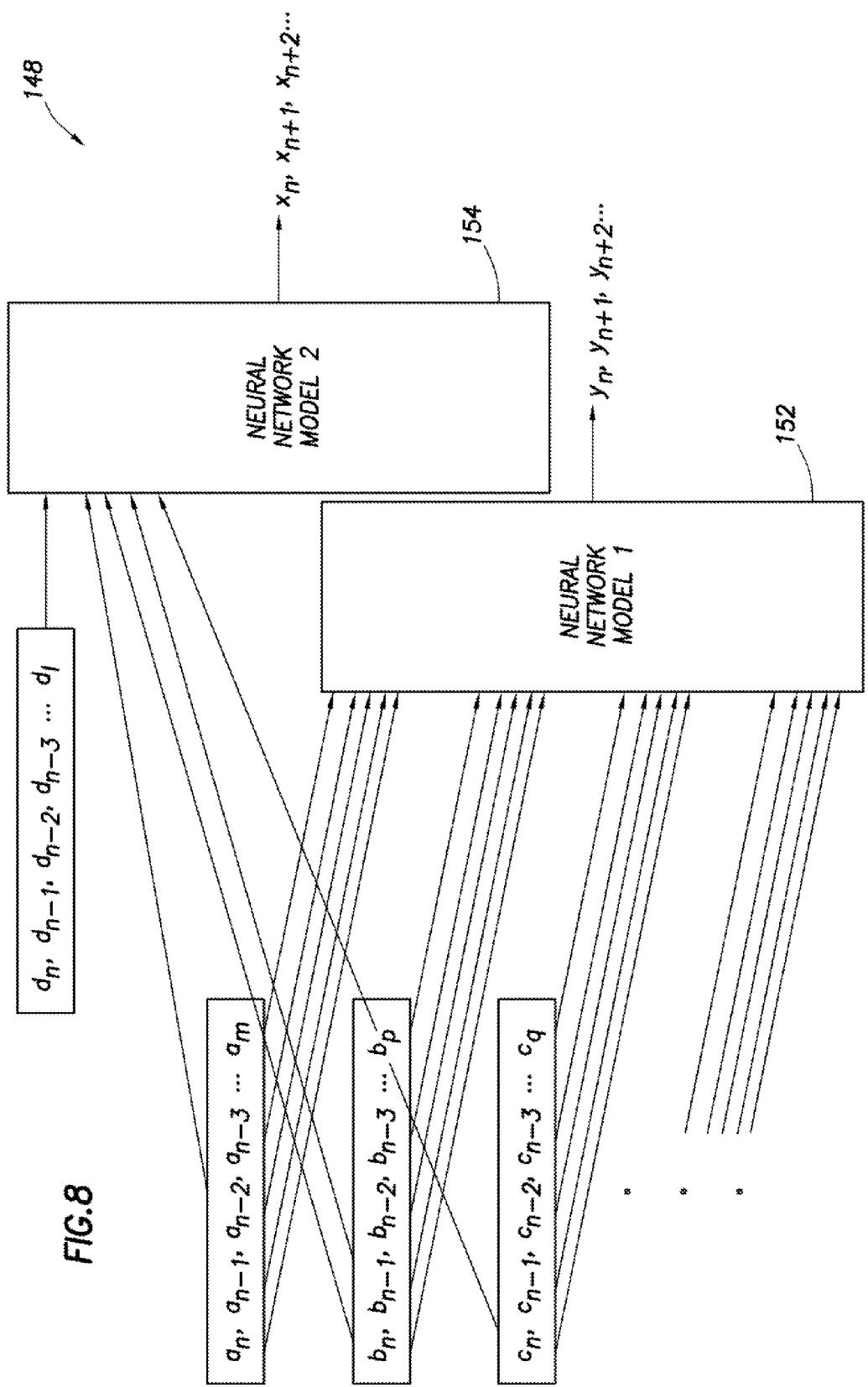

If multiple neural networks are used, it is not necessary for all of the neural networks to share the same inputs. In an example representatively illustrated in FIG. 8, two neural network models 152, 154 are used. The neural network models 152, 154 share some of the same input parameters, but the model 152 has some parameter input values which the model 154 does not share, and the model 154 has parameter input values which are not input to the model 152.

If a neural network model 152 outputs predicted values for only a single parameter associated with a particular sensor (or other source for an actual parameter value), then if that sensor (or other actual parameter value source) fails, the neural network model which predicts its output can be used to supply the parameter values while operations continue uninterrupted. Since the neural network model 152 in this situation is used only for predicting values for a single parameter, training of the neural network model can be conveniently stopped as soon as the failure of the sensor (or other actual parameter value source) occurs, without affecting any of the other neural network models being used to predict other parameter values.

Figure 9:
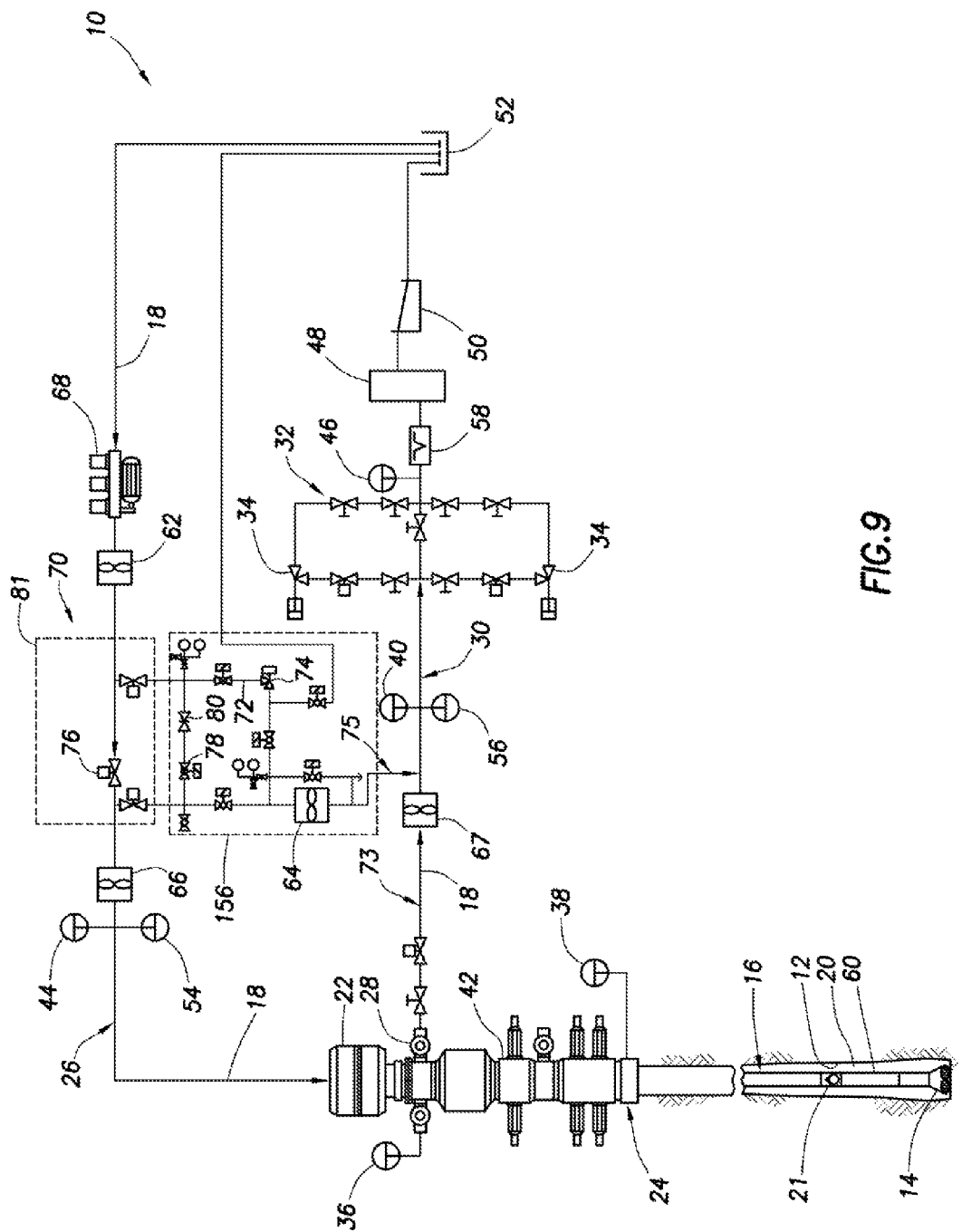
FIG. 9 is a schematic view of another configuration of the well drilling system.

Referring additionally now to FIG. 9, another configuration of the well drilling system 10 is representatively and schematically illustrated. The configuration of FIG. 9 is similar in most respects to the configuration of FIG. 2.

However, in the FIG. 9 configuration, the flow control device 78 and flow restrictor 80 are included with the flow control device 74 and flowmeter 64 in a separate flow diversion unit 156. The flow diversion unit 156 can be supplied as a "skid" for convenient transport and installation at a drilling rig site. The choke manifold 32, pressure sensor 46 and flowmeter 58 may also be provided as a separate unit.

Note that use of the flowmeters 66, 67 is optional. For example, the flow through the standpipe line 26 can be inferred from the outputs of the flowmeters 62, 64, and the flow through the mud return line 73 can be inferred from the outputs of the flowmeters 58, 64.

It may now be fully appreciated that the above disclosure provides substantial improvements to the art of pressure and flow control in drilling operations. Among these improvements is the incorporation of the predictive device 148 and data validator 150 into the pressure and flow control system 90, whereby outputs of sensors and the hydraulic model 92 can be supplied, even if such sensor and/or hydraulic model outputs become unavailable during a drilling operation.

In one well drilling system 10 described above, a predictive device 148 outputs predicted parameter values in response to input of actual parameter values to the predictive device 148. The system 10 includes a source of the actual parameter values (such as sensors 44, 54, 66, 62, 64, 60, 58, 46, 36, 38, 40, 56, 67, the hydraulics model 92, etc.). The predictive device 148 continues to output the predicted parameter values when the predictive device fails to receive valid actual parameter values.

The source of the actual parameter values can comprise a sensor, such as a flowmeter 58, 62, 64, 66, 67. The flowmeter 66 or a combination of flowmeters 62, 64 may measure fluid flow through a standpipe line 26. The standpipe line 26 directs the fluid flow to a drill string 16.

The flowmeter 64 may measure fluid flow through a bypass line 72. The bypass line 72 may provide fluid communication between an output of a rig mud pump 68 and a mud return line 30.

The system 10 can also include a data validator 150 which receives the predicted parameter values from the predictive device 148. The data validator 150 may substitute the predicted parameter values for the actual parameter values upon the failure to receive valid actual parameter values.

The system 10 can include a data validator 150 which receives the actual parameter values and evaluates whether the actual parameter values are valid. The data validator 150 may compare the actual parameter values to a predetermined acceptable range of parameter values and/or compare the actual parameter values to the predicted parameter values.

The data validator 150 can communicate valid parameter values to a hydraulics model 92. The source of the actual parameter values may include the hydraulics model 92, and the actual parameter values may include desired annulus pressure setpoints. The hydraulics model 92 may communicate a desired annulus pressure setpoint to a controller 96 which controls operation of at least one flow control device 34, 74, 76, 78.

The data validator 150 may communicate valid parameter values to a controller 96 which controls operation of at least one flow control device 34, 74, 76, 78.

The predictive device 148 may comprise at least one neural network model 152, 154.

Also described above is a well drilling system 10 which includes a predictive device 148 which outputs predicted parameter values in response to input of actual parameter values to the predictive device, and a data validator 150 which communicates valid actual parameter values to the predictive device 148, but does not communicate invalid actual parameter values to the predictive device 148.

The data validator 150 may signal the predictive device 148 to stop training for output of predicted parameter values which correspond to invalid actual parameter values.

The predictive device 148 may continue to output the predicted parameter values when invalid actual parameter values are received by the data validator 150.

The data validator 150 may receive the predicted parameter values from the predictive device 148.

The data validator 150 may substitute the predicted parameter values for the invalid actual parameter values.

The data validator 150 may receive the actual parameter values and evaluate whether the actual parameter values are either valid or invalid.

The above disclosure also describes a method of maintaining a desired downhole pressure during a well drilling operation. The method preferably includes the steps of: measuring at least one parameter with at least one sensor 44, 54, 66, 62, 64, 60, 58, 46, 36, 38, 40, 56, 67; communicating actual parameter values from the sensor to a predictive device 148; training the predictive device 148 to output predicted parameter values in response to input of the actual parameter values to the predictive device 148; and outputting the predicted parameter values from the predictive device 148 when the predictive device ceases receiving the actual parameter values.

The measuring, communicating, training and outputting steps may be performed while making a connection in a drill string 16.

The method can also include dividing flow of drilling fluid 18 between a line 26 in communication with an interior of the drill string 16 and a line 30 in communication with an annulus 20 formed between the drill string 16 and a wellbore 12, with the flow dividing step including permitting flow through a first flow control device 78 interconnected between a pump 68 and the interior of the drill string 16 and permitting flow through a second flow control device 74 interconnected between the pump 68 and the annulus 20, while flow is permitted through the first flow control device 78.

The sensor can comprise a flowmeter 62, 66 which measures flow of the fluid 18 between the pump 68 and the interior of the drill string 16. The sensor can comprise a flowmeter 64 which measures flow of the fluid 18 between the pump 68 and a line 30 in communication with the annulus 20.

The communicating step can include a data validator 150 communicating valid actual parameter values to the predictive device 148, but preventing communication of invalid actual parameter values to the predictive device 148.

The data validator 150 can signal the predictive device 148 to stop training for output of predicted parameter values which correspond to invalid actual parameter values. The predictive device 148 can continue to output the predicted parameter values when invalid actual parameter values are received by the data validator 150. The data validator 150 may receive the predicted parameter values from the predictive device 148. The data validator 150 can substitute the predicted parameter values for the invalid actual parameter values.

The data validator 150 may receive the actual parameter values and evaluate whether the actual parameter values are either valid or invalid. The data validator 150 may compare the actual parameter values to a predetermined acceptable range of parameter values and/or compare the actual parameter values to the predicted parameter values.

The data validator 150 may communicate the valid actual parameter values to a hydraulics model 92. The actual parameter values may comprise desired annulus pressure setpoints output by the hydraulics model 92.

Training the predictive device 148 can include inputting to the predictive device 148 data generated by a computer simulation of a well drilling system 10.

It is to be understood that the various embodiments of the present disclosure described herein may be utilized in various orientations, such as inclined, inverted, horizontal, vertical, etc., and in various configurations, without departing from the principles of the present disclosure. The embodiments are described merely as examples of useful applications of the principles of the disclosure, which is not limited to any specific details of these embodiments.

In the foregoing description of representative embodiments in this disclosure, directional terms, such as "above," "below," "upper," "lower," etc., are used for convenience in referring to the accompanying drawings. In general, "above," "upper," "upward" and similar terms refer to a direction toward the earth's surface along a wellbore, and "below," "lower," "downward" and similar terms refer to a direction away from the earth's surface along the wellbore.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure. Accordingly, the foregoing detailed description is to be clearly understood as being given by way of illustration and example only, the spirit and scope of the present invention being limited solely by the appended claims and their equivalents.

What is claimed is:

1. A well drilling system, comprising:
    a predictive device which outputs predicted parameter values in response to input of actual parameter values to the predictive device;
    a source of the actual parameter values;
    wherein the predictive device continues to output the predicted parameter values when the predictive device fails to receive valid actual parameter values; and
    a data validator which receives the predicted parameter values from the predictive device and substitutes the predicted parameter values for the actual parameter values when the actual parameter values are invalid.

2. The system of claim 1, wherein the source of the actual parameter values comprises a sensor.

3. The system of claim 2, wherein the sensor comprises a flowmeter.

4. The system of claim 3, wherein the flowmeter measures fluid flow through a standpipe line.

5. The system of claim 4, wherein the standpipe line directs the fluid flow to a drill string.

6. The system of claim 3, wherein the flow meter measures fluid flow through a bypass line.

7. The system of claim 6, wherein the bypass line provides fluid communication between an output of a rig mud pump and a mud return line.

8. The system of claim 1, wherein the data validator receives the actual parameter values and evaluates whether the actual parameter values are valid.

9. The system of claim 8, wherein the data validator compares the actual parameter values to a predetermined acceptable range of parameter values.

10. The system of claim 8, wherein the data validator compares the actual parameter values to the predicted parameter values.

11. The system of claim 8, wherein the data validator communicates valid parameter values to a hydraulics model.

12. The system of claim 11, wherein the source of the actual parameter values comprises the hydraulics model, and wherein the actual parameter values comprise desired annulus pressure setpoints.

13. The system of claim 11, wherein the hydraulics model communicates a desired annulus pressure setpoint to a controller which controls operation of at least one flow control device.

14. The system of claim 8, wherein the data validator communicates valid parameter values to a controller which controls operation of at least one flow control device.

15. The system of claim 1, wherein the predictive device comprises at least one neural network model.

16. A well drilling system, comprising:
a predictive device which outputs predicted parameter values in response to input of actual parameter values to the predictive device; and
a data validator which communicates valid actual parameter values to the predictive device, but does not communicate invalid actual parameter values to the predictive device.

17. The system of claim 16, wherein the data validator signals the predictive device to stop training for output of predicted parameter values which correspond to invalid actual parameter values.

18. The system of claim 16, wherein the predictive device continues to output the predicted parameter values when invalid actual parameter values are received by the data validator.

19. The system of claim 16, wherein the data validator receives the predicted parameter values from the predictive device.

20. The system of claim 19, wherein the data validator substitutes the predicted parameter values for the invalid actual parameter values.

21. The system of claim 16, wherein the data validator receives the actual parameter values and evaluates whether the actual parameter values are either valid or invalid.

22. The system of claim 21, wherein the data validator compares the actual parameter values to a predetermined acceptable range of parameter values.

23. The system of claim 21, wherein the data validator compares the actual parameter values to the predicted parameter values.

24. The system of claim 16, wherein the data validator communicates the valid actual parameter values to a hydraulics model.

25. The system of claim 24, wherein the actual parameter values comprise desired annulus pressure setpoints output by the hydraulics model.

26. The system of claim 24, wherein the hydraulics model communicates a desired annulus pressure setpoint to a controller which controls operation of at least one flow control device.

27. The system of claim 16, wherein a sensor outputs the actual parameter values.

28. The system of claim 27, wherein the sensor comprises a flowmeter.

29. The system of claim 28, wherein the flowmeter measures fluid flow through a standpipe line.

30. The system of claim 29, wherein the standpipe line directs the fluid flow to a drill string.

31. The system of claim 28, wherein the flow meter measures fluid flow through a bypass line.

32. The system of claim 31, wherein the bypass line provides fluid communication between an output of a rig mud pump and a mud return line.

33. The system of claim 16, wherein the predictive device comprises at least one neural network model.

34. A method of maintaining a desired downhole pressure during a well drilling operation, the method comprising the steps of:
measuring at least one parameter with at least one sensor;
communicating actual parameter values from the sensor to a data validator;
communicating valid actual parameter values from the data validator to a predictive device, but preventing communication of invalid actual parameter values to the predictive device;
training the predictive device to output predicted parameter values in response to input of the valid actual parameter values to the predictive device; and
outputting the predicted parameter values from the predictive device when the predictive device ceases receiving the valid actual parameter values.

35. The method of claim 34, wherein the measuring, communicating, training and outputting steps are performed while making a connection in a drill string.

36. The method of claim 35, further comprising:
dividing flow of drilling fluid between a line in communication with an interior of the drill string and a line in communication with an annulus formed between the drill string and a wellbore;
the flow dividing step including permitting flow through a first flow control device interconnected between a pump and the interior of the drill string; and
the flow dividing step including permitting flow through a second flow control device interconnected between the pump and the annulus, while flow is permitted through the first flow control device.

37. The method of claim 36, wherein the sensor comprises a flowmeter which measures flow of the fluid between the pump and the interior of the drill string.

38. The method of claim 36, wherein the sensor comprises a flowmeter which measures flow of the fluid between the pump and a line in communication with the annulus.

39. The method of claim 34, wherein the data validator signals the predictive device to stop training for output of predicted parameter values which correspond to invalid actual parameter values.

40. The method of claim 34, wherein the predictive device continues to output the predicted parameter values when invalid actual parameter values are received by the data validator.

41. The method of claim 34, wherein the data validator receives the predicted parameter values from the predictive device.

42. The method of claim 41, wherein the data validator substitutes the predicted parameter values for the invalid actual parameter values.

43. The method of claim 34, wherein the data validator receives the actual parameter values and evaluates whether the actual parameter values are either valid or invalid.

44. The method of claim 43, wherein the data validator compares the actual parameter values to a predetermined acceptable range of parameter values.

45. The method of claim 43, wherein the data validator compares the actual parameter values to the predicted parameter values.

46. The method of claim 34, wherein the data validator communicates the valid actual parameter values to a hydraulics model.

47. The method of claim 46, wherein the valid actual parameter values comprise desired annulus pressure setpoints output by the hydraulics model.

48. The method of claim 46, wherein the hydraulics model communicates a desired annulus pressure setpoint to a controller which controls operation of at least one flow control device.

49. The method of claim 34, wherein the predictive device comprises at least one neural network model.

50. The method of claim 34, wherein training the predictive device further comprises inputting to the predictive device data generated by a computer simulation of a well drilling system.

* * * * *

UNITED STATES PATENT AND TRADEMARK OFFICE
CERTIFICATE OF CORRECTION

PATENT NO. : 8,397,836 B2
APPLICATION NO. : 13/492688
DATED : March 19, 2013
INVENTOR(S) : Charles M. Pool et al.

Page 1 of 1

It is certified that error appears in the above-identified patent and that said Letters Patent is hereby corrected as shown below:

Title Page, below Item (22) insert

-- Foreign Application Priority Data
12 November 2010 (WO) .......... PCT/US10/56433 --.

Signed and Sealed this
Twenty-second Day of October, 2013

Teresa Stanek Rea
*Deputy Director of the United States Patent and Trademark Office*